(12) United States Patent
Hench et al.

(10) Patent No.: US 8,461,730 B2
(45) Date of Patent: Jun. 11, 2013

(54) RADIAL FLUX PERMANENT MAGNET ALTERNATOR WITH DIELECTRIC STATOR BLOCK

(75) Inventors: Steven C. Hench, Annapolis, MD (US); Charles R. Fralick, Ashburn, VA (US)

(73) Assignee: Science Applications International Corporation, San Diego, CA (US)

( * ) Notice: Subject to any disclaimer, the term of this patent is extended or adjusted under 35 U.S.C. 154(b) by 480 days.

(21) Appl. No.: 12/778,586

(22) Filed: May 12, 2010

(65) Prior Publication Data

US 2011/0278847 A1    Nov. 17, 2011

(51) Int. Cl.
*H02K 1/04*    (2006.01)

(52) U.S. Cl.
USPC .................................... 310/43; 310/156.12

(58) Field of Classification Search
USPC ...... 310/43, 156.12, 156.13, 265; 290/42–43, 290/53, 54–55
See application file for complete search history.

(56) References Cited

U.S. PATENT DOCUMENTS

| | | | |
|---|---|---|---|
| 1,502,511 A | 7/1924 | Marvin | |
| 2,990,803 A | 7/1961 | Henderson | 114/230 |
| 3,001,371 A | 9/1961 | Gilmore, Jr. et al. | 61/48 |
| 3,070,061 A | 12/1962 | Rightmyer | 115/34 |
| 3,231,749 A | 1/1966 | Hink, III | 290/53 |
| 3,654,807 A | 4/1972 | Deskey | 73/180 |
| 3,691,573 A | 9/1972 | Laudato, Jr. | 441/16 |
| 3,763,703 A | 10/1973 | Man | 73/182 |
| 3,800,128 A | 3/1974 | Kurk | 701/21 |
| 3,814,910 A | 6/1974 | Palmieri et al. | 701/21 |
| 3,875,388 A | 4/1975 | Luten et al. | 701/21 |
| 3,881,094 A | 4/1975 | Taylor et al. | 701/21 |
| 3,881,095 A | 4/1975 | Taylor et al. | 701/21 |
| 3,968,353 A | 7/1976 | Kuller | 701/21 |
| 4,110,630 A | 8/1978 | Hendel | 290/53 |
| 4,168,556 A | 9/1979 | Fink et al. | 114/264 |
| 4,266,143 A | 5/1981 | Ng | 290/53 |
| 4,317,047 A | 2/1982 | de Almada | 290/53 |
| 4,340,821 A | 7/1982 | Slonim | 290/53 |
| 4,340,936 A | 7/1982 | Mounce | 701/200 |
| 4,352,023 A | 9/1982 | Sachs et al. | 290/42 |
| 4,405,866 A | 9/1983 | Masuda et al. | 290/53 |
| 4,423,334 A | 12/1983 | Jacobi et al. | 290/53 |
| 4,438,343 A | 3/1984 | Marken | 290/53 |
| 4,490,621 A | 12/1984 | Watabe et al. | 290/42 |
| 4,527,951 A | 7/1985 | Trier | 416/145 |
| 4,531,063 A | 7/1985 | Vielmo et al. | 290/53 |
| 4,549,267 A | 10/1985 | Drabouski, Jr. | 701/124 |

(Continued)

OTHER PUBLICATIONS

"Wooden Low-RPM Alternator" [online], Copyright 2000 [retrieved on Mar. 29, 2012], 15 pp., Retrieved From the Internet: http://www.otherpower.com/pmg2.html.

(Continued)

*Primary Examiner* — Thanh Lam
(74) *Attorney, Agent, or Firm* — Bey & Cotropia, PLLC (57) ABSTRACT

An energy conversion system is described and includes a cylindrical rotor having a mass and multiple magnets affixed on an outer face thereof; a cylindrical stator including a dielectric cylinder wound with copper wire in a predetermined configuration, the cylindrical rotor being placed within the cylindrical stator; and a rotatable shaft for rotating the rotor, the rotatable shaft being placed in the center of the cylindrical rotor. The system harvests environmental energy for lower power generation and accounts for non-mechanical sources of rotational resistance within the generator.

27 Claims, 8 Drawing Sheets

U.S. PATENT DOCUMENTS

| | | | |
|---|---|---|---|
| 4,631,921 A | 12/1986 | Linderfelt | 60/501 |
| 4,674,324 A | 6/1987 | Benoit | 73/65.03 |
| 4,708,592 A | 11/1987 | Krolick et al. | 416/176 A |
| 4,748,338 A | 5/1988 | Boyce | 290/42 |
| 4,781,023 A | 11/1988 | Gordon | 60/506 |
| 4,785,404 A | 11/1988 | Sims et al. | 701/200 |
| 4,843,250 A | 6/1989 | Stupakis | 290/53 |
| 4,851,704 A | 7/1989 | Rubi | 290/53 |
| 4,872,118 A | 10/1989 | Naidenov et al. | 701/124 |
| 4,954,110 A | 9/1990 | Warnan | 441/22 |
| 5,048,356 A | 9/1991 | Levko | 74/60 |
| 5,268,881 A | 12/1993 | Damm | 368/134 |
| 5,341,757 A | 8/1994 | Digiacomo | 114/230.27 |
| 5,411,422 A | 5/1995 | Robertson | 440/48 |
| 5,424,582 A | 6/1995 | Trepl, II et al. | 290/53 |
| 5,452,216 A | 9/1995 | Mounce | 701/214 |
| 5,460,099 A | 10/1995 | Matsuhisa et al. | 105/148 |
| 5,499,889 A | 3/1996 | Yim | 405/76 |
| 5,608,160 A | 3/1997 | Chastonay | 73/65.03 |
| 5,696,413 A | 12/1997 | Woodbridge et al. | 310/15 |
| 5,770,893 A | 6/1998 | Youlton | 290/53 |
| 5,789,826 A | 8/1998 | Kumbatovic | 290/53 |
| 5,908,122 A | 6/1999 | Robinett et al. | 212/275 |
| 5,924,845 A | 7/1999 | Bagley et al. | 416/145 |
| 5,929,531 A | 7/1999 | Lagno | 290/53 |
| 6,020,653 A | 2/2000 | Woodbridge et al. | 290/53 |
| 6,106,411 A | 8/2000 | Edwards | 473/292 |
| 6,216,625 B1 | 4/2001 | Baluha | 114/230.27 |
| 6,308,649 B1 | 10/2001 | Gedeon | 114/39.11 |
| 6,441,516 B1 * | 8/2002 | Kaelin et al. | 310/36 |
| 6,616,402 B2 | 9/2003 | Selsam | 415/3.1 |
| 6,647,716 B2 | 11/2003 | Boyd | 60/398 |
| 6,681,572 B2 | 1/2004 | Flory | 60/507 |
| 6,823,810 B2 | 11/2004 | Carlson et al. | 114/125 |
| 6,833,631 B2 | 12/2004 | Van Breems | 290/42 |
| 6,864,614 B2 * | 3/2005 | Murray | 310/216.059 |
| 6,994,047 B1 | 2/2006 | Pent, III | 114/230.27 |
| 7,042,110 B2 | 5/2006 | Mikhail et al. | 290/44 |
| 7,105,939 B2 | 9/2006 | Bednyak | 290/42 |
| 7,143,363 B1 | 11/2006 | Gaynor et al. | 715/771 |
| 7,199,481 B2 | 4/2007 | Hirsch | 290/42 |
| 7,239,038 B1 | 7/2007 | Zimmerman et al. | 290/54 |
| 7,298,054 B2 | 11/2007 | Hirsch | 290/42 |
| 7,362,004 B2 | 4/2008 | Becker | 290/55 |
| 7,375,436 B1 | 5/2008 | Goldin | 290/42 |
| 7,436,082 B2 | 10/2008 | Ruse et al. | 290/42 |
| 7,440,848 B2 | 10/2008 | Anderson | 701/207 |
| 7,453,165 B2 | 11/2008 | Hench | 290/53 |
| 7,538,445 B2 | 5/2009 | Kornbluh et al. | 290/53 |
| 7,557,456 B2 | 7/2009 | Kornbluh et al. | 290/42 |
| 7,625,255 B2 | 12/2009 | Ide et al. | 440/88 M |
| 7,629,704 B2 | 12/2009 | Hench | 290/53 |
| 7,649,276 B2 | 1/2010 | Kornbluh et al. | 290/53 |
| 2001/0000274 A1 | 4/2001 | Gorlov | 114/274 |
| 2003/0173922 A1 * | 9/2003 | Pelonis | 318/439 |
| 2004/0046474 A1 * | 3/2004 | Kalsi | 310/179 |
| 2004/0239199 A1 * | 12/2004 | Qu et al. | 310/114 |
| 2005/0285407 A1 * | 12/2005 | Davis et al. | 290/54 |
| 2007/0137195 A1 | 6/2007 | Tayla et al. | 60/397 |
| 2007/0138793 A1 | 6/2007 | Zimmerman et al. | 290/1 R |
| 2007/0251230 A1 | 11/2007 | Zimmerman et al. | 60/497 |
| 2008/0054639 A1 * | 3/2008 | Maier et al. | 290/40 R |
| 2008/0093858 A1 | 4/2008 | Hench | 290/53 |
| 2008/0224472 A1 | 9/2008 | Bean | 290/42 |
| 2008/0265582 A1 | 10/2008 | Hench | 290/53 |
| 2009/0008942 A1 | 1/2009 | Clement et al. | 290/53 |
| 2009/0127856 A1 | 5/2009 | Hench | 290/42 |
| 2009/0160191 A1 | 6/2009 | Beane | 290/53 |
| 2010/0072752 A1 | 3/2010 | Park et al. | 290/52 |
| 2010/0123315 A1 | 5/2010 | Anderson, Jr. | 290/53 |
| 2010/0148512 A1 | 6/2010 | Pitre | 290/54 |
| 2011/0012358 A1 | 1/2011 | Brewster et al. | 290/53 |
| 2011/0278847 A1 | 11/2011 | Hench et al. | 290/53 |

OTHER PUBLICATIONS

"Wind Turbine Power Calculations, RWE npower renewables" [online], Mechanical and Electrical Engineering, Power Industry, The Royal Academy of Engineering, [retrieved on Feb. 24, 2011], 5 pp., Retrieved From the Internet: http://www.raeng.org.uk/education/diploma/maths/pdf/exemplars_advanced/23_Wind_Turbine.pdf.

"Producing Renewable Electricity with a Hybrid, Bluenergy Solarwind Turbine," 2 pp., Copyright 2009-2011, www.bluenergyusa.com.

"Development of the Helical Reaction Hydraulic Turbine," Final Technical Report, Project Period: Jul. 1, 1996-Jun. 30, 1998, Submission to: The US Department of Energy, Prepared by: Dr. Alexander Gorlov, PI, MIME Department, Northeastern University, 59 pp., Aug. 1998.

Rasila, Mika, "Torque and Speed Control of a Pitch Regulated Wind Turbine," Department of Electric Power Engineering, Chalmers University of Technology, Goteborg, Sweden, 67 pp., 2003.

International Search Report and Written Opinion issued for PCT/US2009/031675, dated Mar. 30, 2009, 8 pp.

Timmons, Heather, "Energy From the Restless Sea," The New York Times, Aug. 3, 2006, New York, New York.

"noah li-leger" [online], The Creative World at Work, Copyright 2010 [retrieved on Apr. 16, 2010], 1 p., Retrieved From the Internet: http://www.coroflot.com/public/individual_profile.asp?individual_id=140221&sort_by=1&.

"UBC Entrepreneurs Harness Wave Energy" [online], UBC This Week, Mar. 9, 2006 [retrieved on Apr. 16, 2010], 4 pp., Retrieved From the Internet: http://www.publicaffairs.ubc.ca/ubcthisweek/2006/06mar09.html.

"Wavelength—Wavelength Power Solutions" [online], The Creative World at Work, Copyright 2010 [retrieved on Apr. 16, 2010], 4 pp., Retrieved From the Internet: http://www.coroflot.com/public/individual_file.asp?individual_id=140221&portfolio_id=342501&sort_by=1&.

Alves, Marco, et al., "Hydrodynamic Optimization of a Wave Energy Converter Using a Heave Motion Buoy," *Proceedings of the 6th Int. Conf. on Wave and Tidal Energy*, Porto, Portugal, 2007.

"Pelamis Wave Energy Converter" [online], [retrieved on Apr. 23, 2012], 4 pp., Retrieved From the Internet: http://en.wikipedia.org/wiki/Pelamis_Wave_Energy_Converter.

Evans, Paul, "Ocean-Power Installation Up and Running," gizmag, Mar. 2, 2009 [retrieved on Apr. 23, 2012], 5 pp., Retrieved From the Internet: http://www.gizmag.com/wave-power-owc/11122/.

von Jouanne, A., Brekken, T.K.A., "Creating Energy From Ocean Waves" [online], Wallace Energy Systems & Renewables Facility, Oregon State University, Copyright 2012 [retrieved on Apr. 23, 2012], 2 pp., Retrieved From the Internet: http://eecs.engr.oregonstate.edu/wesrf/.

World Energy Council, "2007 Survey of Energy Resources," Ocean Thermal Energy Conversion, 9 pp.

Specification and Drawings for U.S. Appl. No. 13/415,645, filed Mar. 8, 2012, 22 pp.

Kane, M., "California Small Hydropower and Ocean Wave Energy Resources," In Support of the 2005 Integrated Energy Policy Report, Presented at: California Energy Commission, Sacramento, California, 29 pp., May 9, 2005.

Previsic, Mirko, et al., "E21 EPRI Assessment, Offshore Wave Energy Conversion Devices," Electricity Innovation Institute, 52 pp., Jun. 16, 2004.

Bedard, Roger, "Feasibility of Using Wavewatch III for Days-Ahead Output Forecasting for Grid Connected Wave Energy Projects in Washington and Oregon, Stage Gate #2 Final Report, EPRI-WP012," Electric Power Research Institute, 78 pp., Feb. 29, 2008.

Bedard, Roger, et al., "North American Ocean Energy Status—Mar. 2007," 8 pp.

Rondorf, Neil, "A Virginia-Based Marine Renewable Energy Technologies," Presentation to VRTAC, 19 pp., Sep. 19, 2006.

Koola, Paul Mario, et al., "The Dynamics of Wave Carpet, a Novel Deep Water Wave Energy Design," *Oceans 2003 Proceedings*, vol. 4, pp. 2288-2293, Sep. 22-26, 2003, San Diego, California.

Kim, Jin-Ha, et al., "An Experimental Study on the Reverse Wave Drift Force of a BBDB Type OWC Wave Energy Device," *Proceedings of The Seventh (2006) ISOPE Pacific/Asia Offshore Mechanics Symposium*, pp. 237-242, Dalian, China, Sep. 17-21, 2006.

"Linear Control of Wave Energy Converters" [online], Lancaster University Renewable Energy Group—Wave Energy, [retrieved on Jun. 12, 2012], 3 pp., Retrieved From the Internet: http://www.engineering.lancs.ac.uk/lureg/group_research/wave_energy_research/Linear_C . . . .

Khan, Jahangir and Bhuyan, Gouri S., "Ocean Energy: Global Technology Development Status," A report prepared by Powertech Labs Inc. for the IEA-OES under Annex I—Review, Exchange and Dissemination of Information on Ocean Energy Systems, IEA-OES Document No. T0104, 83 pp., Mar. 2009.

Brekken, T.K.A., von Jouanne, A. HaiYue Han, "Ocean Wave Energy Overview and Research at Oregon State University," School of Electr. Eng. & Comp. Sci., Oregon State Univ., Corvallis, OR, Power Electronics and Machines in Wind Applications, PEMWA 2009, IEEE, Jun. 24-26, 2009.

International Search Report and Written Opinion for Application No. PCT/US2011/027635, dated May 25, 2011, 9 pp.

\* cited by examiner

FIG. 1

FRONT VIEW
FIG. 3

SECTION A-A
FIG. 4

RADIAL FLUX PERMANENT MAGNET ALTERNATOR WITH DIELECTRIC STATOR BLOCK

BACKGROUND OF THE INVENTION

1. Field of the Invention

Efficient dynamo-based production of electrical power in environmental energy harvesting and other applications in which the dynamo rotor is driven at low and variable revolutions per minute. Specific applications include powering systems aboard unmanned maritime platforms and wind power generation.

2. Description of the Related Art

Extraction of useful energy from locally available environmental sources is becoming vitally important to a wide range of applications, and immediately so for remote sensing and communications devices for military and civilian uses. A common element in all devices that harvest environmental energy from kinetic sources such as moving wind or water is the electrical dynamo, which must be capable of operating without an external source of current and therefore typically utilizes permanent magnets. Numerous electrical dynamo designs exist and are patented. In particular, these designs include vertical and horizontal axis wind turbines and kinetic power pendulum-type devices which respond to X-Y forces (with respect to the pendulum's rotational axis).

BRIEF SUMMARY OF THE INVENTION

Summary of the Problem

These existing power generation systems used to, for example, power individual buoys, fail to identify and account for significant sources of resistance which decrease net power output. More specifically, prior art dynamos suffer from non-mechanical sources of rotational resistance arising from the interaction of the moving permanent magnets with ferrous, metallic, or otherwise conductive components of the generator. These sources of resistance include, generally: "cogging," which is caused by attraction between the permanent magnets and the ferrous cores at the center of the stator's coils and Eddy currents which form in conductive materials and create a tangible mechanical resistance and "leak" energy as they flow through the conductive materials (typically aluminum or steel) in structural components, most notably the generator housing. The two forces are amplified by the step-up ratio between the original moving source (usually a rotating shaft) and the required working speed of the generator to achieve a useable electrical output voltage and current (according to Faraday's Law). The requirement for mechanical step-up, e.g., some form of transmission, is a source of initial cost and the primary source of unscheduled maintenance, which itself is a major cost element for remote applications. Further, many buoys currently rely on solar panels and/or primary and secondary batteries for operational power and often operate at a net power deficit. This results in the need for more frequent maintenance visits and high operation and maintenance costs.

There is a need in the art for a lower power generation solution that accounts for non-mechanical sources of rotational resistance.

Summary of the Solution

A first embodiment of the present invention is an energy conversion system including: cylindrical rotor including a mass and multiple magnets affixed on an outer face thereof; cylindrical stator including a dielectric cylinder wound with copper wire in a predetermined configuration, the cylindrical rotor being placed within the cylindrical stator; and a rotatable shaft for rotating the rotor, the rotatable shaft being placed in the center of the cylindrical rotor.

A second embodiment of the present invention is an energy conversion system including: a cylindrical rotor including an unbalanced mass and multiple magnets affixed on an outer face thereof; a cylindrical stator including a dielectric cylinder wound with copper wire in a radial flux configuration, the cylindrical rotor being placed within the cylindrical stator; and a rotatable shaft for rotating the rotor at less than or equal to 500 rpm, the rotatable shaft being placed in the center of the cylindrical rotor.

BRIEF DESCRIPTION OF THE FIGURES

The following figures are intended to be illustrative of the exemplary embodiments of the present invention and are to be considered in conjunction with the descriptions provided herein.

DETAILED DESCRIPTION OF THE INVENTION

Figure 1:
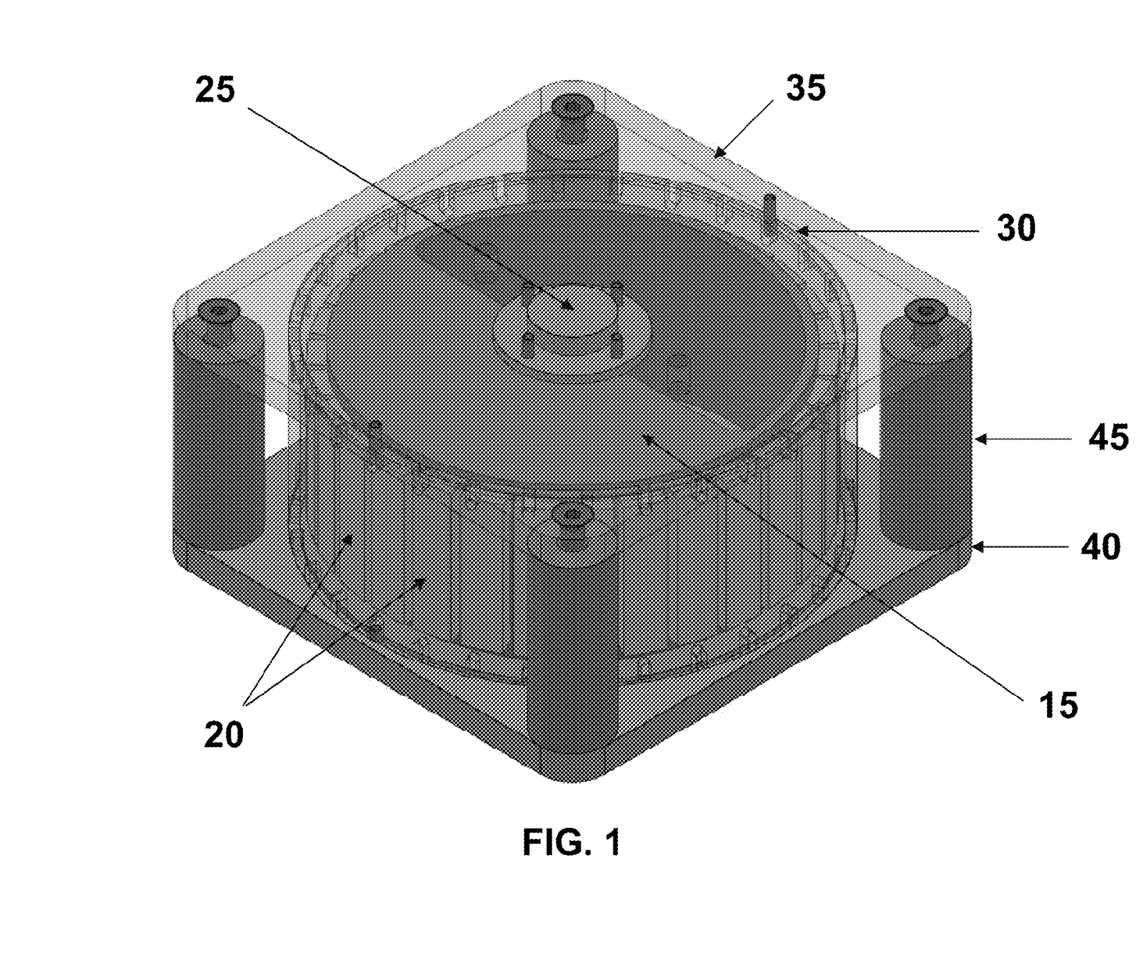
FIG. 1 illustrates an energy conversion system in accordance with an exemplary embodiment.

In an exemplary embodiment of the present invention, an energy conversion system 10 in a radial flux configuration as shown in FIG. 1 includes at least the following components: a rotor assembly including rotor 15, magnets 20, shaft 25; stator 30; upper plate 35 (optional); lower plate 40 (optional) and spacers 45 (optional). Each of these components is described in more detail herein.

Figure 2:
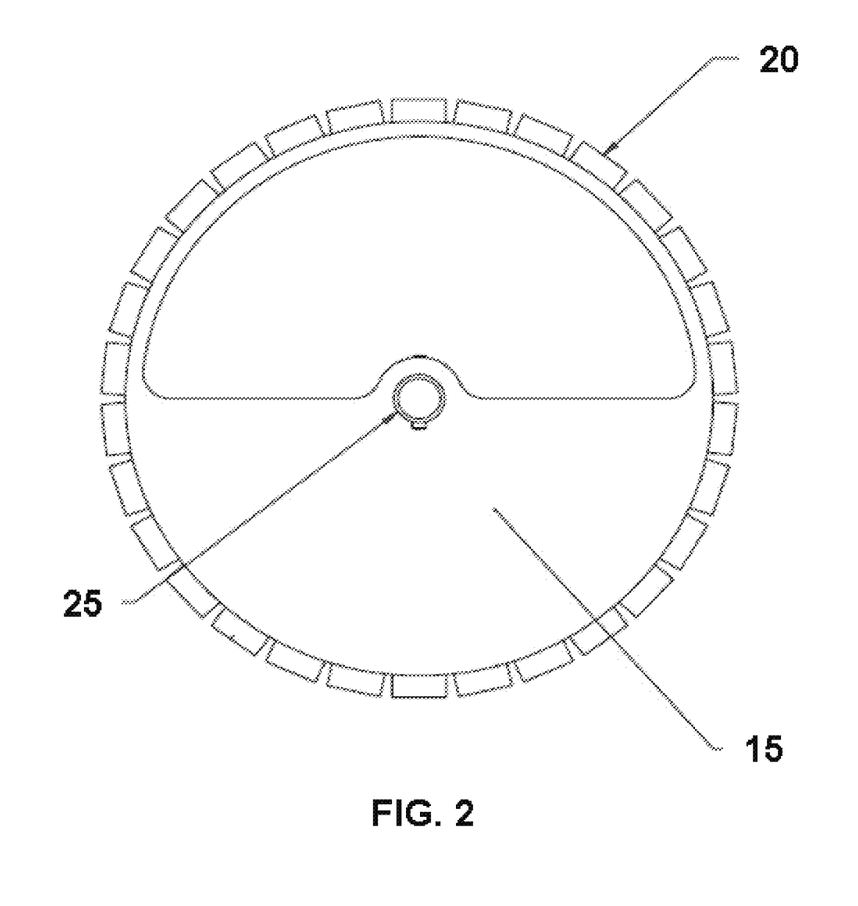
FIG. 2 illustrates a top view of a rotor component of an energy conversion system in accordance with an exemplary embodiment.
Figure 3:
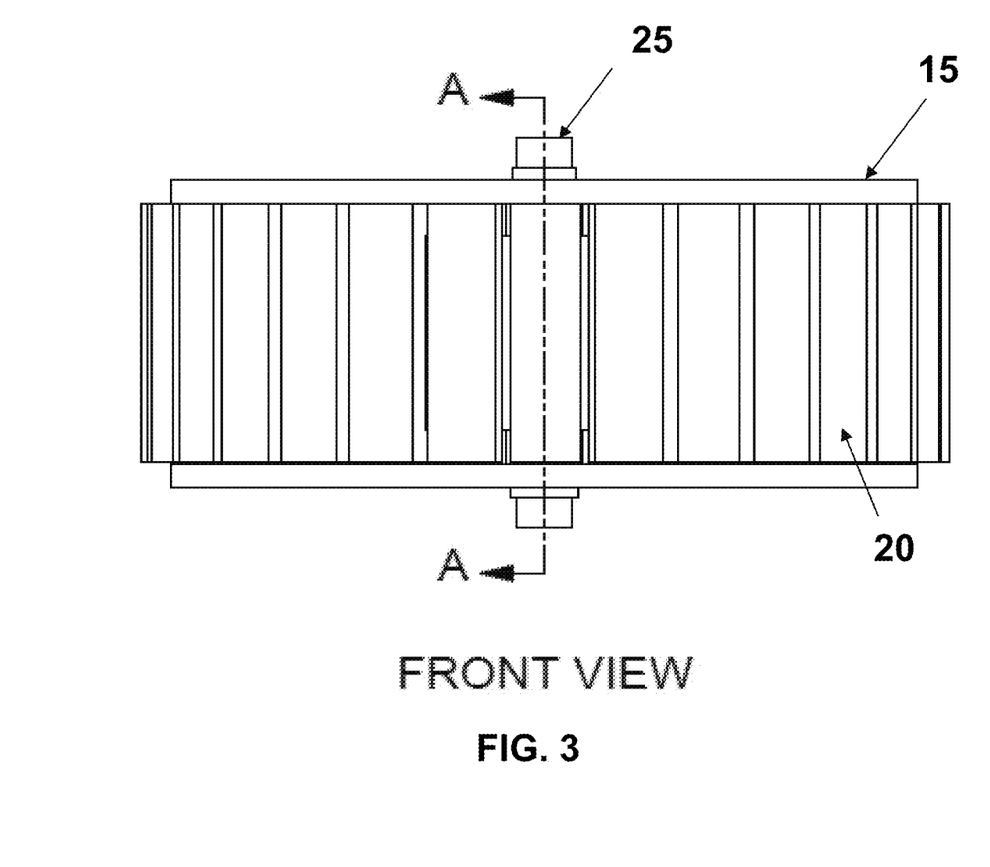
FIG. 3 illustrates an external side view of a rotor component of an energy conversion system in accordance with an exemplary embodiment.
Figure 4:
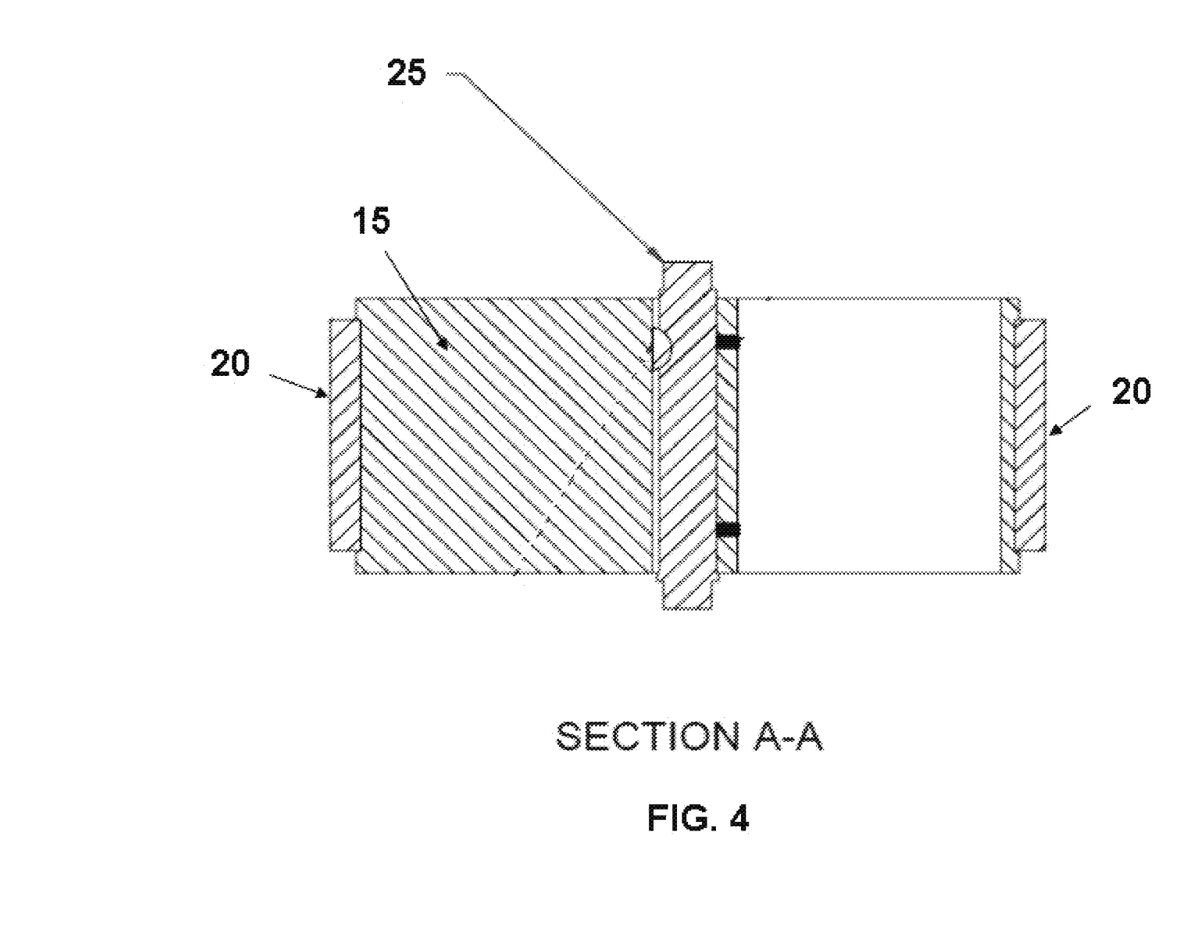
FIG. 4 illustrates a cross-sectional view of rotor component of an energy conversion system in accordance with an exemplary embodiment.

The energy conversion system 10 is based on the use of permanent magnets in what is known as a radial flux configuration. The configuration is brushless and results in much greater swept coil area in the same footprint as an axial-flux design and is well suited to low rotational speed applications as low as approximately 1 rpm. FIGS. 2 through 4 illustrate top, front and cross-sectional views of the rotor assembly which includes rotor 15, permanent magnets 20 and shaft 25. In a particular embodiment, there are 30 neodymium magnets 20 affixed to the outside of cylindrical steel rotor 15 with approximately equal spacing between each magnet. The rotor 15 rotates around axial steel shaft 25 and contains an unbalanced mass. One skilled in the art recognizes that the number and spacing of magnets is changeable in accordance with optimization parameters. Similarly, rotor material and configuration, e.g., hollow, solid, unbalanced, can also be manipulated in accordance with end use requirements. These variations fall within the scope of the invention.

Figure 5:
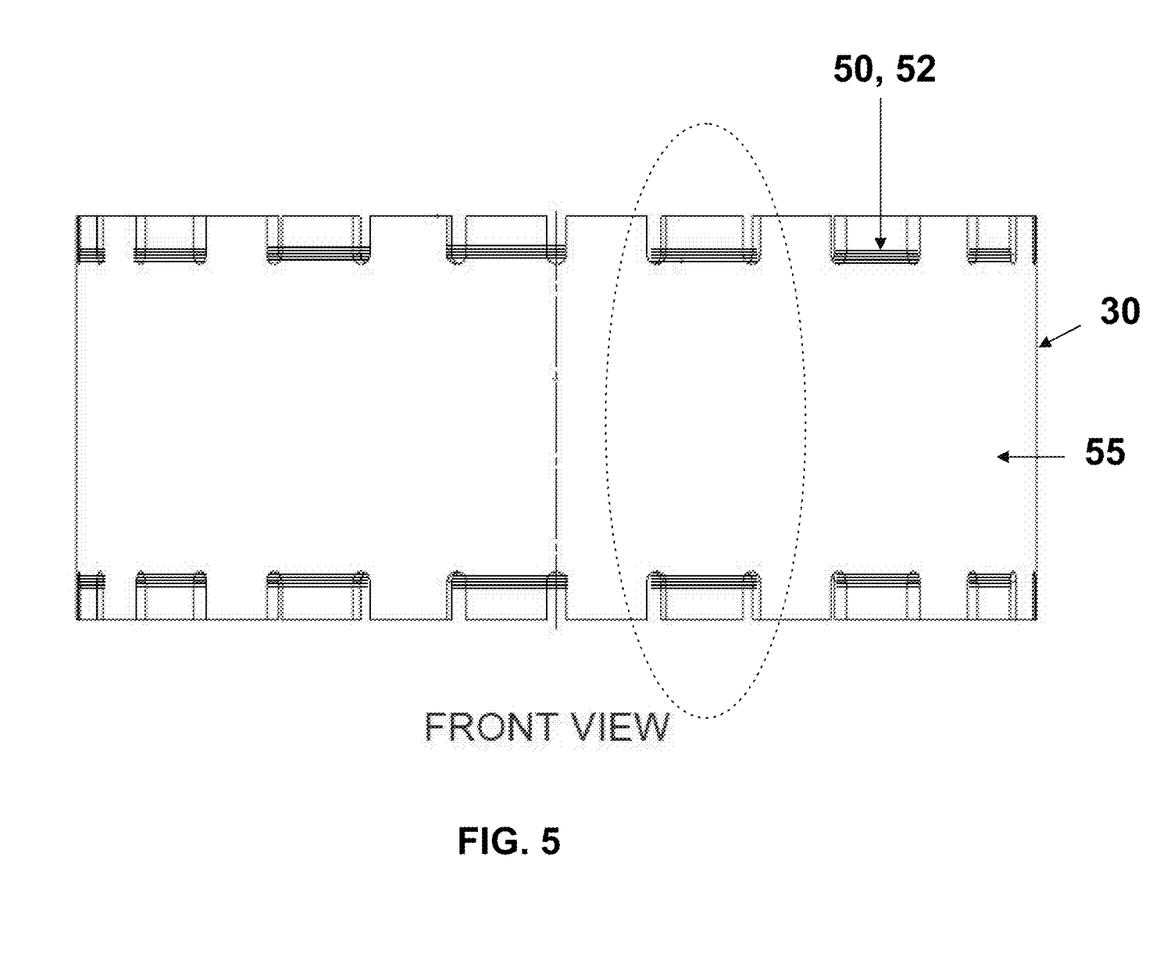
FIG. 5 illustrates an external side view of a stator component of an energy conversion system in accordance with an exemplary embodiment.
Figure 6:
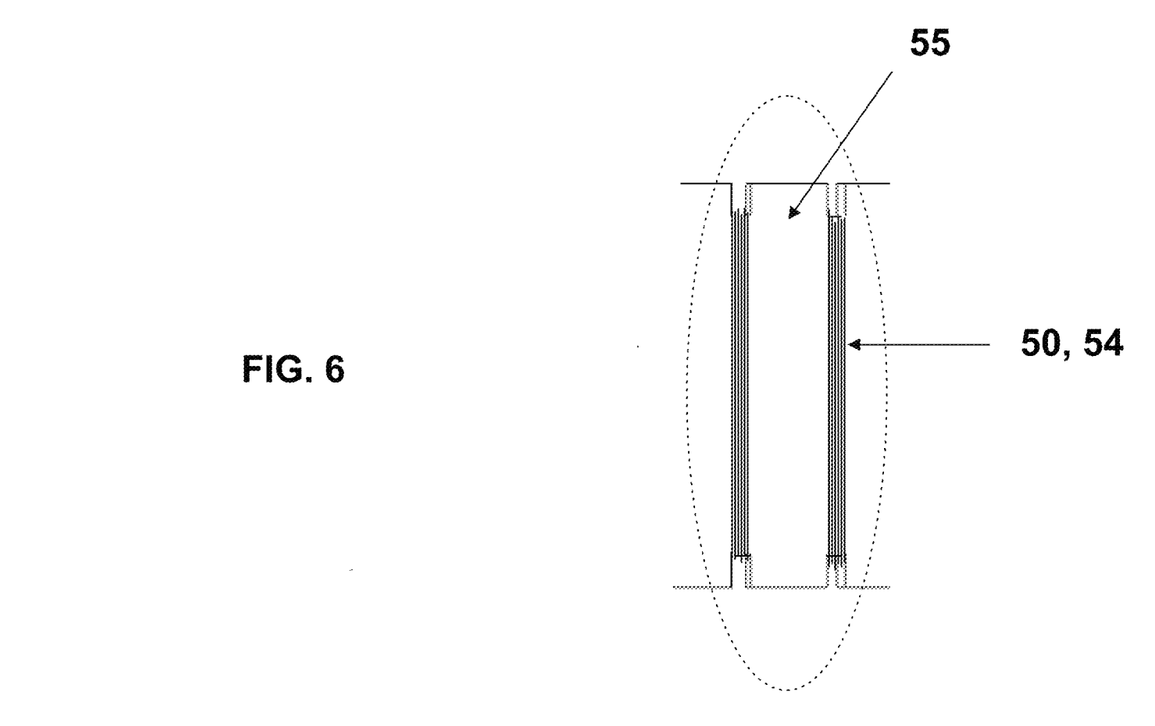
FIG. 6 illustrates an internal side view of a representative section of a stator component of an energy conversion system in accordance with an exemplary embodiment.

Referring to FIG. 5, encompassing the rotor assembly is an air-core stator 30 consisting of copper wire coils 50 affixed to a cylinder 55 consisting of a dielectric material such as fiberglass. The use of dielectric material for the cylinder significantly reduces or eliminates eddy current drag forces, which otherwise oppose rotation of the rotor even when the stator coil circuit is open (no load). In FIG. 5, the front or outside view shows top and bottom horizontal portions 52 of a single coil which is wrapped through niches 57 of the cylinder 55. FIG. 6 illustrates the back or inside view of a single coil illustrating the vertical portions 54 of a single coil which meet at top and bottom with horizontal portions 52. The vertical coil portions 54 face magnets 20 affixed to the outside of the rotor 15. The generated magnetic fields move orthogonally to the vertical coil portions 54. In our exemplary embodiment, there are 15 single coils, each comprised of two horizontal 52 and two vertical portions 54. The spacing between vertical coil portions is approximately 1 inch (2.54 cm) in the exemplary embodiment. One skilled in the art recognizes that spacing of coils, as well as wrapping configurations are variable in accordance with optimization of output. For example, each of the individual single coils could be wrapped individually, i.e., using 15 individual pieces of copper wire. Alternatively, a single piece of copper wire could be wound continuously to form all 15 individual single coils. An advantage to the separate pieces to form individual single coils is ease of replacement in the event coil loss, damage, etc.

The coils may be locked into position using a low viscosity epoxy to counteract the pulling or vibration. Movement of the wires is also a source of energy loss. Epoxy binding is a common practice in the construction of virtually all motors and generators. Alternatively, the coils could be held in place using an inner sleeve cylinder that press-fits inside the stator after the windings are in place. Like the stator cylinder, this sleeve would be constructed of dielectric material and serve to maintain a physical barrier between the magnets and the coils as well as ensure that the "air gap" (which includes the dielectric material) is maintained at controlled tolerances.

In an exemplary embodiment used for converting wave energy, a diameter of the rotor and stator combination was optimized to account for significant frequency dependence. Accordingly, a specific exemplary, but non-limiting embodiment includes a 10 inch (25.4 cm) diameter rotor with individual magnet dimensions of 4 inch×1 inch×½ inch (10.16× 2.54×1.27 cm). Each single coil is comprised of 50 turns of 24-gauge copper wire. In this exemplary embodiment, approximately 4 inches (10.16 cm) along the run of each vertical portion 54 of copper wire for each single coil that is actually being influenced by the magnetic field as it sweeps by, and only 1 inch plus the loss in each end of 0.5 in (horizontal portion 52), so for each single coil there is 4 in.+4 in+1 in.+1 in.+0.5 in=10.5 inches (26.7 cm) of copper wire in each single coil, of which 8 inches are effectively used in operation. This is a significantly greater use ratio than would be available in an axial flux design. Another parameter that is controlled is length to width aspect ratio of the individual magnets; the longer the magnets are the greater the aspect ratio of the magnets, the more efficient the coil usage and the more efficient the generator. The exemplary embodiment significantly reduces or even removes current loss, heat and demagnetization by minimizing use of conducting materials. Where such losses are essentially noise in systems employed to generate 100 kilowatts of power, for low power applications, such as wave energy converters, which are employed to generate on the order of watts, these losses cannot be tolerated.

The exemplary system described above is scalable. Using a polyphase configuration, wherein an equal amount of power is generated out of each individual phase, the rotor diameter can exceed 100 inches (254 cm) in diameter and be scaled to over 100 kilowatts. Based upon the application, given in terms of desired power, voltage, and expected rotation rate, the number of turns of copper wire in the coils, and the thickness of wire in the coils, may be increased. It is appreciated that for optimal design the overall impedance of the stator coils must be kept to a minimum. For a given rotational speed, higher voltage can be achieved by increasing the number of turns while at the same time using thinner wire so that the overall dimensions of the stator coils do not change. In this way, a single rotor design may be used for a variety of applications by merely swapping pre-wound stators of equal dimension but differing coil counts. It should be recognized that increasing the diameter of the rotor and stator increases the overall power by the $4^{th}$ power of the ratio of the change in diameter, for any given rotation speed. e.g., doubling diameter increases output power a factor of 16. This occurs because the number of poles (swept area) is doubled, which squares the power, and also because the velocity of the rotor doubles, which also squares the power (according to Faraday's Law). Thus, if a 10-inch diameter alternator produces 12 volts at 15 rpm (sufficient to charge a 12-volt battery system), a 20-inch diameter alternator produces 48 volts at 15 rpm if the same wire and coils are used. In the latter case, to reduce the voltage and increase current, according to Ohms Law, the number of turns of wire would be halved (say, from 50 to 25), and the wire cross sectional area would be doubled (diameter increased by the square root of 2, 1.4142). For this reason, this alternator design is particularly adaptable from both engineering and economic perspectives.

In an alternative embodiment the configuration takes advantage of the high voltages produced by making each individual coil redundant by putting bypass diodes between each single coil, or around them, such that if one coil has a break in it, e.g., it is not producing any more power, and is automatically and passively bypassed as no longer a part of the stator series circuit. With the bypass diode configuration, the resistance through the diodes breaks down once the remaining operational coils contribute, so that they can all be run in series with bypass diodes. And in yet a further embodiment, each coil is wired in parallel and run lower voltage and higher current. So, for example, if the operational requirement is to run at 100 rpm at 12 volts, parallel coil wiring is preferred as an alternative to reducing the number of coil turns throughout the stator. Wave power applications involving direct drive, as with the horizontal pendulum, operate at 10 to 100 RPM. Vertical axis wind turbines may operate at 10 to 400 RPM, depending on wind speed and turbine radius. If the application was for a wind turbine running at a 100 rpm, a reduction in the number of turns in the wire would reduce the voltage and at the same time an increase in wire diameter (gauge) results in lower resistance (loss), but takes up the same amount of physical space. In this configuration, the lower voltage is offset by lower losses with use of thicker wires. Accordingly, the configurations described herein encompass variations in stator winding and electrical arrangements as needed to optimize output and other requirements or constraints and include, but are not limited to single or multiple phase arrangements such as: continuous coil;

individual coils in series; individual coils in parallel; individual coils in series with bypass diodes.

Figure 7:
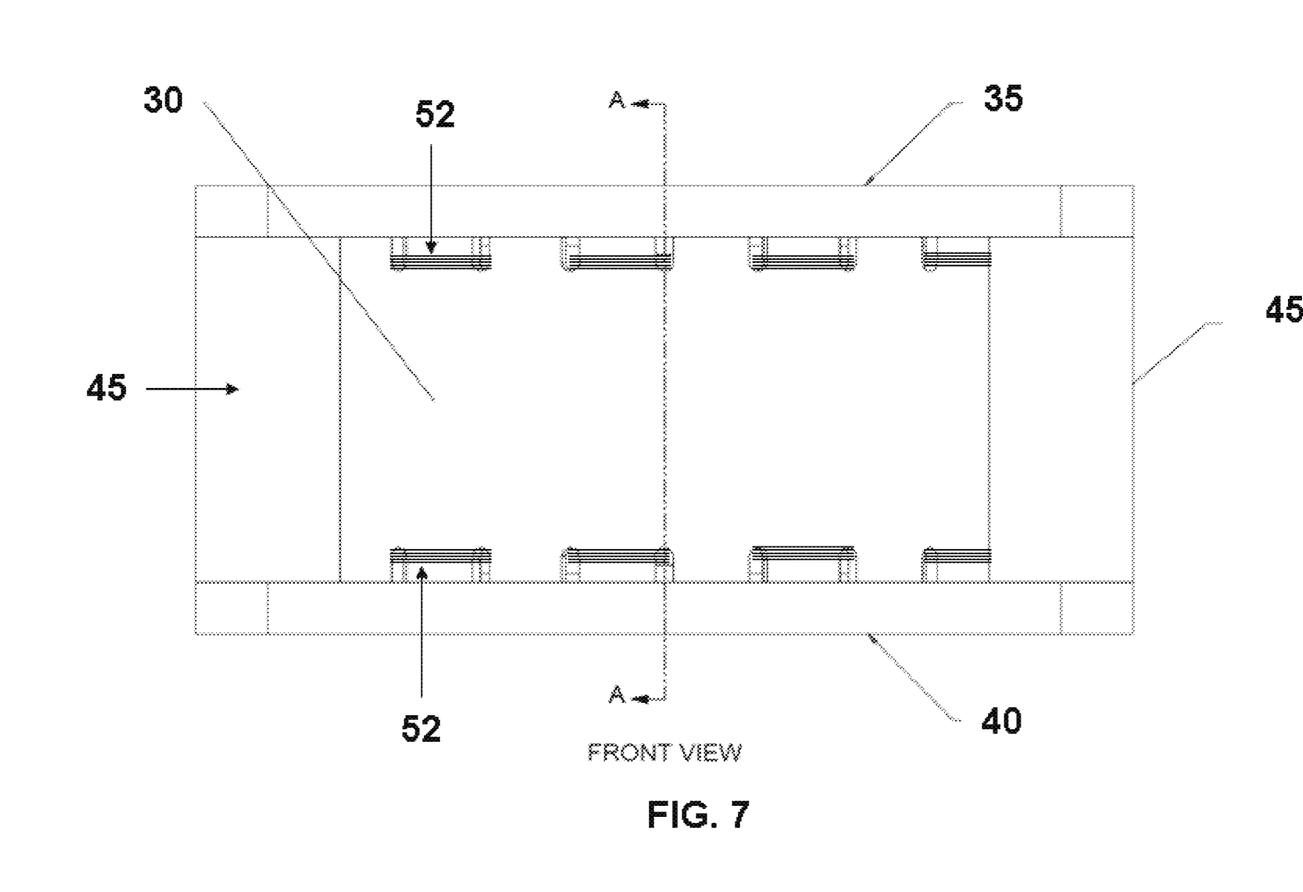
FIG. 7 illustrates an external side view of an energy conversion system in accordance with an exemplary embodiment.
Figure 8:
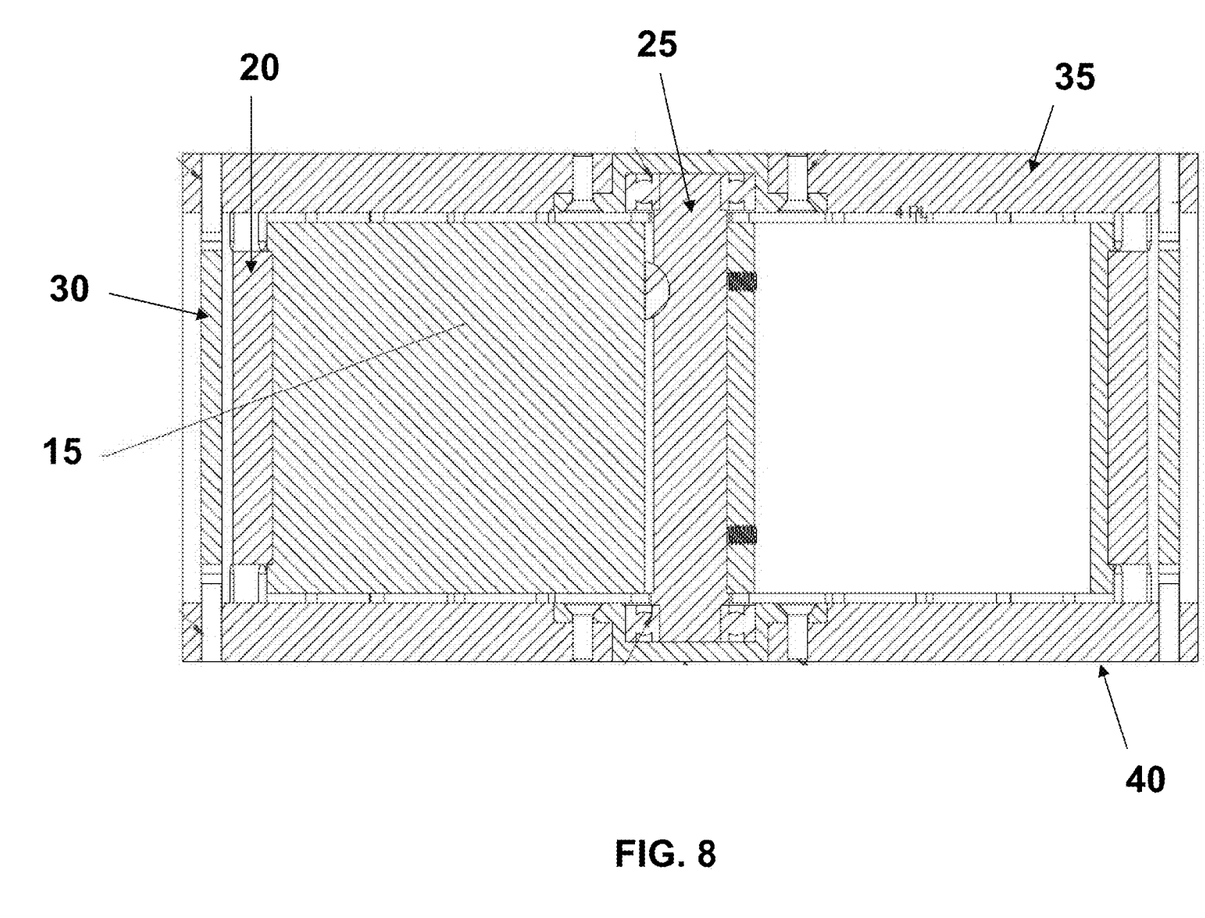
FIG. 8 illustrates a cross-sectional view of an energy conversion system in accordance with an exemplary embodiment.

The rotor and stator assembly could stand alone or, alternatively, be held together with an upper plate 35, lower plate 40 and spacers 45 formed of non-conductive material, such as fiberglass. In order to avoid the need for metal bolts or screws, the plates can be machined with a groove that matched the circumference of the stator so that the stator fits snuggly within the groove. The groove may also have raised teeth or pins (of nonconductive material) that interlock with one or more stator slots to prevent rotation of the stator. FIG. 7 shows a side view of the full generator assembly in accordance with an exemplary embodiment including stator 30, upper plate 35, lower plate 40 and spacers 45. And FIG. 8 is a cross-sectional view of the full generator assembly of FIG. 7 shows rotor 15, magnets 20, shaft 25, stator 30, upper plate 35 and lower plate 40.

The exemplary configurations described above result from the identification and neutralization of detracting forces previously overlooked and insignificant in the generator field. Specifically, for harvesting at low rotational speeds to produce relatively low power, e.g., on the order of watts, the configurations described herein minimize sources of non-mechanical rotational resistance caused by, for example, the buildup of eddy currents and cogging forces in ferrous or conductive elements in motion-relative components of a permanent magnet alternator. In theory, the spin-down time for a dynamo should be governed by the friction in its bearings and with the air. A low-friction device should have a relatively long spin-down time. However, it can be readily shown that typical generators have very short spin-down times, even when no electrical load is applied. Laboratory experiments and application of theory (Lenz, Maxwell, and Faraday), led researchers to the conclusion that these excess forces are the result of eddy current drag, which is overlooked when a powerful prime mover such as an internal combustion engine is used. In fact, this eddy current drag is a significant source of "friction" and is released in the form of heat in the generator. Utilizing the configurations described herein, the spin down time can be increased from several seconds to several minutes as a direct result of the application of these principles in the form of dielectric construction materials. This approach is distinctive from prior art configurations, even those identified as having a "substantially ironless" stator, as some steel is used to help direct the magnetic fields—resulting in some cogging. The exemplary embodiments described herein eliminate the presence of iron, conductive, or otherwise magnetically interactive materials from the vicinity of the stator or alternator housing.

To that end, the configurations are constructed to utilize dielectric structural materials to prevent counter-electromagnetic field (EMF) or eddy currents in certain structural components. This includes the materials use for the stator block, top and bottom plates, and structural elements such as legs, and outer housing. The exemplary configurations are able to produce useful voltages at very low rotational speeds, eliminating the requirements for step-up gearing from low-speed, high-torque input (also known as break-out torque), which is frequently encountered with various "renewable" energy harvesting technologies, including: wind turbines, both horizontal and vertical (e.g., Savonius, Darrius); Riverine and tidal current turbines and drogues; and certain types wave energy conversion (WEC) devices.

Operation at very low rotational speeds offers the following advantages: enables direct 1:1 rotational speed with wind turbines and kinetic reaction mass devices (wave energy); reduces or eliminates the requirement for transmissions and gearboxes, which reduces costs and complexity and scheduled maintenance requirements while increasing reliability and mean time to failure, which is important in remote marine applications; reduces or eliminates the requirement for precision balancing of the rotor to manage vibration, with cost savings; reduces wear on bearings; relaxes structural considerations due to very high centrifugal forces of high-speed rotors; generates less mechanical friction heating; increases mechanical reliability; reduces eddy current reaction in the permanent magnets, reducing heating in the magnets and improving performance and lifetime.

The exemplary system described herein has unlimited applicability. While immediate applications for the technology include remote low power applications such as individual ocean buoys in the single digit watt power output range, the scalability of the technology would allow for power output up to an in excess of 100 kilowatts. Other potential uses include unmanned maritime platforms and remote cellular communications power stations. The exemplary embodiment described above generates output power in the range of approximately 2 to 20 watts. The energy conversion system is intended to be a plug-and-play generator where output wires can be connected directly to a power supply, e.g., such as the payload power supply on a buoy.

The embodiments set forth herein are intended to be exemplary of the described inventive concepts and are in no way intended to limit the scope of the invention thereto. One skilled in the art recognizes the numerous variations that are inherently contemplated by the invention as described.

The invention claimed is:

1. An energy conversion system comprising:
a cylindrical rotor including a mass and multiple magnets affixed on an outer face thereof;
a cylindrical stator including a dielectric cylinder wound with copper wire in a predetermined configuration, the cylindrical rotor being placed within the cylindrical stator; and
a rotatable shaft for rotating the rotor, the rotatable shaft being placed in the center of the cylindrical rotor.

2. The energy conversion system of claim 1, wherein the dielectric cylinder includes multiple notches at a top and bottom of a circumference thereof; and
further wherein the copper wire is wound through the multiple notches.

3. The energy conversion system of claim 2, wherein the predetermined configuration includes multiple coils of copper wire, wherein a single coil includes two horizontal portions and two vertical portions formed by winding the copper wire through four notches; and
further wherein the vertical portions of the coils face the multiple magnets affixed to the outer face of the cylindrical rotor.

4. The energy conversion system of claim 3, wherein the coils are held in place using at least one of epoxy and a dielectric sleeve.

5. The energy conversion system of claim 3, wherein a bypass diode is connected between each single coil.

6. The energy conversion system of claim 1, wherein the rotor is steel; the multiple magnets are neodymium; and the cylinder is fiberglass, ceramic, or other suitable dielectric material.

7. The energy conversion system of claim 1, wherein the system generates output power in the range of 2 to 20 watts.

8. The energy conversion system of claim 1, wherein the system generates output power at a rotational speed of 1 to 500 rpm.

9. The energy conversion system of claim 1, wherein there are no conductive materials within an operational range of the rotor, such that non-mechanical resistance to rotation of the rotor is minimized.

10. The energy conversion system of claim 1, wherein the rotatable shaft rotates in response to at least one source of kinetic energy selected from the group consisting of water and wind.

11. The energy conversion system of claim 1, wherein the system does not include gears.

12. An energy conversion system for converting wave energy to electrical power comprising:
   a cylindrical rotor including an unbalanced mass and multiple magnets affixed on an outer face thereof;
   a cylindrical stator including a dielectric cylinder wound with copper wire in a radial flux configuration, the cylindrical rotor being placed within the cylindrical stator; and
   a rotatable shaft for rotating the rotor at less than or equal to 500 rpm, the rotatable shaft being placed in the center of the cylindrical rotor.

13. The energy conversion system of claim 12, wherein the dielectric cylinder includes multiple notches at a top and bottom of a circumference thereof; and
   further wherein the copper wire is wound through the multiple notches.

14. The energy conversion system of claim 13, wherein the predetermined configuration includes multiple coils of copper wire, wherein a single coil includes two horizontal portions and two vertical portions formed by winding the copper wire through four notches; and
   further wherein the vertical portions of the coils face the multiple magnets affixed to the outer face of the cylindrical rotor.

15. The energy conversion system of claim 14, wherein the coils are held in place using at least one of epoxy and a dielectric sleeve.

16. The energy conversion system of claim 14, wherein a bypass diode is connected between each single coil.

17. The energy conversion system of claim 12, wherein the rotor is steel; the multiple magnets are neodymium; and the cylinder is fiberglass, ceramic, or other dielectric material.

18. The energy conversion system of claim 12, wherein the system generates output power in the range of 2 to 20 watts.

19. The energy conversion system of claim 12, wherein there are no conductive materials within an operational range of the rotor, such that non-mechanical resistance to rotation of the rotor is minimized.

20. The energy conversion system of claim 12, wherein the rotatable shaft rotates in response to at least one source of kinetic energy selected from the group consisting of water and wind.

21. The energy conversion system of claim 12, wherein the system does not include gears.

22. An energy conversion system consisting of:
   a single cylindrical rotor including an unbalanced mass and multiple magnets affixed on an outer face thereof;
   a cylindrical stator including a dielectric cylinder wound with copper wire in a predetermined configuration, the cylindrical rotor being placed within the cylindrical stator; and
   a rotatable shaft for rotating the rotor, the rotatable shaft being placed in the center of the cylindrical rotor.

23. The energy conversion system of claim 22, wherein the dielectric cylinder includes multiple notches at a top and bottom of a circumference thereof; and
   further wherein the copper wire is wound through the multiple notches.

24. The energy conversion system of claim 23, wherein the predetermined configuration includes multiple coils of copper wire, wherein a single coil includes two horizontal portions and two vertical portions formed by winding the copper wire through four notches; and
   further wherein the vertical portions of the coils face the multiple magnets affixed to the outer face of the cylindrical rotor.

25. The energy conversion system of claim 24, wherein the coils are held in place using at least one of epoxy and a dielectric sleeve.

26. The energy conversion system of claim 24, wherein a bypass diode is connected between each single coil.

27. The energy conversion system of claim 22, wherein the rotor is steel; the multiple magnets are neodymium; and the cylinder is fiberglass, ceramic, or other suitable dielectric material.

* * * * *